United States Patent
Kasilya Sudarsan

(10) Patent No.: US 10,311,220 B2
(45) Date of Patent: Jun. 4, 2019

(54) ACCESSING A USER EQUIPMENT USING A BIOMETRIC SENSOR CONCURRENTLY WITH AN AUTHENTICATION PATTERN

(71) Applicant: QUALCOMM Incorporated, San Diego, CA (US)

(72) Inventor: Vishnu Vardhan Kasilya Sudarsan, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 15/255,767

(22) Filed: Sep. 2, 2016

(65) Prior Publication Data

US 2018/0068101 A1   Mar. 8, 2018

(51) Int. Cl.
| | |
|---|---|
| G06F 21/00 | (2013.01) |
| G06F 21/32 | (2013.01) |
| G06F 21/36 | (2013.01) |
| H04L 29/06 | (2006.01) |
| H04W 12/06 | (2009.01) |
| G06K 9/00 | (2006.01) |

(52) U.S. Cl.
CPC .............. *G06F 21/32* (2013.01); *G06F 21/36* (2013.01); *G06K 9/00087* (2013.01); *H04L 63/0861* (2013.01); *H04W 12/06* (2013.01)

(58) Field of Classification Search
CPC ..................................................... G06F 21/32
USPC ........................................................... 726/7
See application file for complete search history.

(56) References Cited

U.S. PATENT DOCUMENTS

| | | | |
|---|---|---|---|
| 8,982,070 B2* | 3/2015 | Tomimori | G06F 3/0483 345/1.1 |
| 9,100,825 B2 | 8/2015 | Schultz et al. | |
| 9,245,165 B2 | 1/2016 | Slaby et al. | |
| 2013/0050533 A1* | 2/2013 | Park | G06K 9/3258 348/239 |
| 2014/0184549 A1 | 7/2014 | Cheng et al. | |
| 2015/0074615 A1* | 3/2015 | Han | G06K 9/00033 715/863 |

(Continued)

FOREIGN PATENT DOCUMENTS

WO    2014206505 A1    12/2014

OTHER PUBLICATIONS

International Search Report and Written Opinion—PCT/US2017/045603—ISA/EPO—dated Oct. 12, 2017.

*Primary Examiner* — Longbit Chai
(74) *Attorney, Agent, or Firm* — Arent Fox LLP

(57) ABSTRACT

The present application relates to authenticating a user of a user equipment (UE). Specifically, the described aspects include presenting for display an authentication pattern on a display of the UE after receiving an input representing a scan of a fingerprint. The authentication pattern may be displayed while the fingerprint sensor continues scanning the finger. Further, the UE may receive a second input representing a removal of the finger from the fingerprint sensor and an authentication pattern characteristic of the authentication pattern. In some aspects, the authentication pattern may be a visual timer, a visual color pattern, and/or a visual shape pattern. The UE may compare the fingerprint scan with a stored fingerprint and the authentication pattern characteristic with a stored authentication pattern characteristic to determine whether to permit the user to access the UE in an unlocked state.

54 Claims, 7 Drawing Sheets

(56) References Cited

U.S. PATENT DOCUMENTS

| | | |
|---|---|---|
| 2015/0089635 A1 | 3/2015 | Alpert et al. |
| 2015/0235018 A1* | 8/2015 | Gupta .................... G06F 21/36 726/19 |
| 2015/0262052 A1 | 9/2015 | Pahuja |
| 2016/0026780 A1* | 1/2016 | Wu ......................... G06F 21/32 382/124 |
| 2016/0140379 A1 | 5/2016 | Pedersen |
| 2016/0210624 A1 | 7/2016 | Niu |

* cited by examiner

ACCESSING A USER EQUIPMENT USING A BIOMETRIC SENSOR CONCURRENTLY WITH AN AUTHENTICATION PATTERN

BACKGROUND

The present disclosure relates generally to communication systems, and more particularly, to accessing a user equipment (UE) using a biometric sensor concurrently with an authentication pattern.

Wireless communication systems are widely deployed to provide various telecommunication services such as telephony, video, data, messaging, and broadcasts. Use of communication devices within such systems has dramatically increased. Communication devices often provide access to a network, such as a Local Area Network (LAN) or the Internet, for example. Other communication devices (e.g., access terminals, laptop computers, smart phones, media players, gaming devices, etc.) may wirelessly communicate with communication devices that provide network access. Some communication devices comply with certain industry standards, such as the Institute of Electrical and Electronics Engineers (IEEE) 802.11 (e.g., Wireless Fidelity or "Wi-Fi") standards. Communication device users, for example, often connect to wireless communication networks using such communication devices.

As the use of communication devices has increased, advancements in security for such devices are being sought. Specifically, UE security has become increasingly significant as UEs have become more personal to the user. For instance, with the storage space of UEs rapidly increasing, UEs can now store large amounts of personal data such as photos, videos, and/or messages. As UE technology has evolved, security features have been added to prevent unauthorized access to such personal data stored at a UE. For example, what began as a request to enter a numerical passcode has now evolved into biometric authentication. Specifically, to access a UE, a user may enter a biometric feature unique to the user. Upon authentication of the user based on the entered biometric features, access to the UE may be permitted. However, limitations currently exist with regard to some of the authentication techniques, including, for instance, some biometric authentication techniques. Such limitations may permit access to the UE by an unauthorized user with possession of a user's biometric feature. As such, a UE that securely authenticates an authorized user of the UE, and in turn, prevents access to an unauthorized user possessing a biometric feature of the authorized user may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. The summary's sole purpose is to present some concepts of one or more aspects in a simplified form as a prelude to the more detailed description that is presented later.

In accordance with an aspect, a method is provided for user authentication at a user equipment (UE). The method may include receiving a first input representing a fingerprint scan of a finger using a fingerprint sensor. The method may further include, while continuing to detect the finger on the fingerprint sensor, displaying, on a display, an authentication pattern in response to receiving the first input. Additionally, the method may include receiving a second input representing a detection of a removal of the finger from the fingerprint sensor. The method may include determining an authentication pattern characteristic of the authentication pattern in response to the detection of the removal of the finger from the fingerprint sensor. Moreover, the method may include determining whether the fingerprint scan corresponds to a stored fingerprint scan and whether the authentication pattern characteristic of the authentication pattern corresponds to a stored authentication pattern characteristic. In addition, the method may include triggering an unlock state in accordance with a determination that the fingerprint scan corresponds to the stored fingerprint scan and the authentication pattern characteristic corresponds to the stored authentication pattern characteristic. Further, the method may include maintaining a locked state in accordance with a determination that the fingerprint scan does not correspond to the stored fingerprint scan or the authentication pattern characteristic does not correspond to the stored authentication pattern characteristic.

In accordance with an aspect, an apparatus is provided for user authentication. The apparatus may include means for receiving a first input representing a fingerprint scan of a finger using a fingerprint sensor. The apparatus may further include, while continuing to detect the finger on the fingerprint sensor, means for displaying, on a display, an authentication pattern in response to receiving the first input. Additionally, the apparatus may include means for receiving a second input representing a detection of a removal of the finger from the fingerprint sensor. The apparatus may include means for determining an authentication pattern characteristic of the authentication pattern in response to the detection of the removal of the finger from the fingerprint sensor. Moreover, the apparatus may include means for determining whether the fingerprint scan corresponds to a stored fingerprint scan and whether the authentication pattern characteristic of the authentication pattern corresponds to a stored authentication pattern characteristic. In addition, the apparatus may include means for triggering an unlock state in accordance with a determination that the fingerprint scan corresponds to the stored fingerprint scan and the authentication pattern characteristic corresponds to the stored authentication pattern characteristic. Further, the apparatus may include means for maintaining a locked state in accordance with a determination that the fingerprint scan does not correspond to the stored fingerprint scan or the authentication pattern characteristic does not correspond to the stored authentication pattern characteristic.

In accordance with an aspect, a computer-readable medium storing computer executable code is provided for user authentication. The computer-readable medium may include code for receiving a first input representing a fingerprint scan of a finger using a fingerprint sensor. The computer-readable medium may further include, while continuing to detect the finger on the fingerprint sensor, code for displaying, on a display, an authentication pattern in response to receiving the first input. Additionally, the computer-readable medium may include code for receiving a second input representing a detection of a removal of the finger from the fingerprint sensor. The computer-readable medium may include code for determining an authentication pattern characteristic of the authentication pattern in response to the detection of the removal of the finger from the fingerprint sensor. Moreover, the computer-readable medium may include code for determining whether the fingerprint scan corresponds to a stored fingerprint scan and whether the authentication pattern characteristic of the authentication pattern corresponds to a stored authentication pattern characteristic. In addition, the computer-readable medium may include code for triggering an unlock state in accordance with a determination that the fingerprint scan corresponds to the stored fingerprint scan and the authentication pattern characteristic corresponds to the stored authentication pattern characteristic. Further, the computer-readable medium may include code for maintaining a locked state in accordance with a determination that the fingerprint scan does not correspond to the stored fingerprint scan or the authentication pattern characteristic does not correspond to the stored authentication pattern characteristic.

In accordance with an aspect, an apparatus comprising a display, a memory, a fingerprint sensor, and at least one processor coupled to the display, the memory, and the fingerprint sensor. The at least one processor is configured to receive a first input representing a fingerprint scan of a finger using the fingerprint sensor. The at least one processor is further configured to, while continuing to detect the finger on the fingerprint sensor, display, on the display, an authentication pattern in response to receiving the first input. Additionally, the at least one processor is further configured to receive a second input representing a detection of a removal of the finger from the fingerprint sensor. The at least one processor is further configured to determine an authentication pattern characteristic of the authentication pattern in response to the detection of the removal of the finger from the fingerprint sensor. Moreover, the at least one processor is configured to determine whether the fingerprint scan corresponds to a stored fingerprint scan and whether the authentication pattern characteristic of the authentication pattern corresponds to a stored authentication pattern characteristic. In addition, at least one processor is configured to trigger an unlock state in accordance with a determination that the fingerprint scan corresponds to the stored fingerprint scan and the authentication pattern characteristic corresponds to the stored authentication pattern characteristic. Further, the at least one processor is configured to maintain a locked state in accordance with a determination that the fingerprint scan does not correspond to the stored fingerprint scan or the authentication pattern characteristic does not correspond to the stored authentication pattern characteristic.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
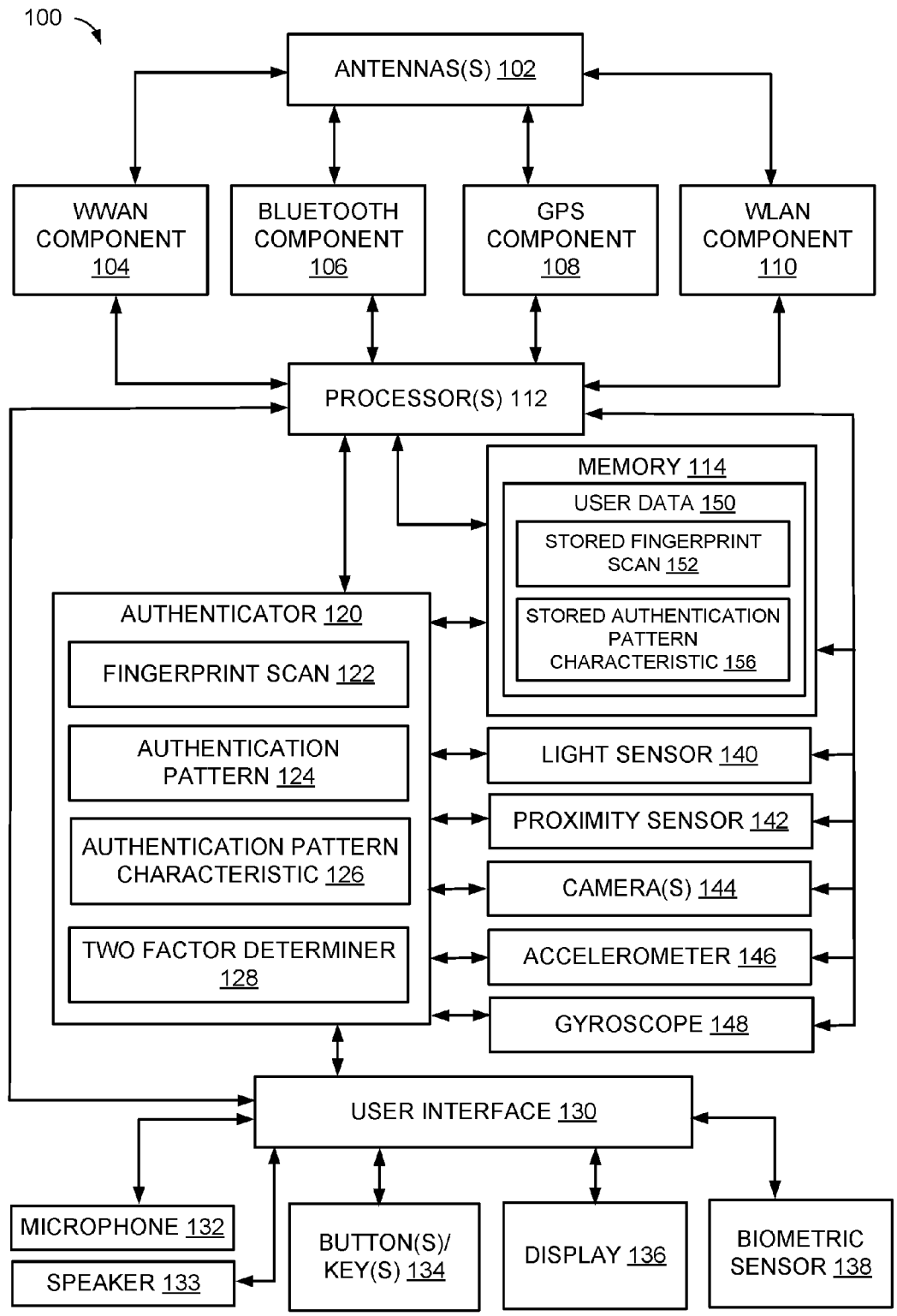
FIG. 1 is an example user equipment (UE) that may authenticate a user in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, various structures and components are shown in block diagram form in order to avoid obscuring such concepts.

Several aspects of communication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station," a smart phone," a "tablet" and variations thereof.

The terminology used herein is for the purpose of describing particular embodiments only and is not intended to be limiting of embodiments of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

The present aspects generally relate to secure user authentication to unlock a user equipment (UE). In particular, various biometric techniques may provide increased access security for a UE. For example, access to a UE may be permitted based on biometric authentication of a user. Specifically, in aspects where the biometric authentication corresponds to a fingerprint authentication, a user may swipe or touch a fingerprint sensor of the UE. Upon finding a valid match of the scanned fingerprint with a stored fingerprint within a database at the UE, the UE may permit access (e.g., trigger an unlock state). However, some biometric techniques such as fingerprint scanning and matching may not be secure. That is, in some cases, a UE may be spoofed by an unauthorized user possessing a biometric feature such as a reproduction of an authorized user's fingerprint. With the fingerprint reproduction, the unauthorized user may obtain access to the authorized user's UE by scanning, via the fingerprint sensor, the reproduced fingerprint. As such, the current techniques of utilizing a single biometric authentication of a user may not effectively prevent unauthorized access of the UE.

In an aspect, a two-factor authentication utilizing a biometric authentication (e.g., fingerprint sensor) in tandem with a concurrent display of a authentication pattern. In one aspect, an authorization pattern selected and configured by an authorized user may be used while or during fingerprint scanning to provide increased security against unauthorized access to a device. For instance, in some aspects, a UE may display a timer while or during fingerprint scanning. The UE may permit access or otherwise trigger an unlock state based on determining that the fingerprint scan matches a stored fingerprint scan at the UE and that the user continuously maintained the scanned finger on the fingerprint sensor for at least a first time and lifted the finger off the fingerprint sensor between the first time and a second time greater than the first time. Further, in some aspects, the UE may display a series or sequence of colors as an authentication pattern while or during fingerprint scanning. The UE may permit access or otherwise trigger an unlock state based on determining that the fingerprint scan matches a stored fingerprint scan at the UE and that the user lifts off or removes the scanned finger during display of a color previously selected by the authorized user. In some aspects, the color may be in a particular segment of the display or that two colors may be displayed.

Additionally, in some aspects, the UE may display a randomized series or sequence of shapes in various portions of the display as an authentication pattern while or during fingerprint scanning of a user's finger. The UE may permit access or otherwise trigger an unlock state based on determining that the fingerprint scan matches a stored fingerprint scan at the UE and that the user lifts off or removes the scanned finger during display of a pre-selected shape within a pre-selected portion of the display. Moreover, in some aspects, the UE may permit or otherwise trigger an unlock state based on determining that a first fingerprint scan in a first direction and a second fingerprint scan in a second direction matches a fingerprint scan stored at the UE and that the first direction and second direction match a pre-selected sequence of fingerprint scan directions. As such, the present aspects provide for enhanced user authentication that prevents access to an unauthorized user possessing a biometric feature of the authorized user by employing a concurrent two-factor authentication.

FIG. 1 is a block diagram illustrating various components of an UE 100. For the sake of simplicity, the various features and functions illustrated in the diagram of FIG. 1 are connected together using a common bus which is meant to represent that the various features and functions are operatively coupled together. Those skilled in the art will recognize that other connections, mechanisms, features, functions, or the like, may be provided and adapted as necessary to operatively couple and configure an actual portable wireless device. Further, in some aspects, one or more of the features or functions illustrated in the example of FIG. 1 may be further subdivided or two or more of the features or functions illustrated in FIG. 1 may be combined.

The UE 100 may include a WWAN component 104 that may be coupled to one or more antennas 102. The WWAN component 104 may include suitable devices, hardware, and/or software for communicating with and/or detecting signals to/from a network entity such as an access point and/or base station, and/or directly with other wireless devices (e.g., other UEs) within a communication network. In an aspect, the WWAN component 104 may comprise a CDMA communication system suitable for communicating with a CDMA network of wireless base stations; however in other aspects, the wireless communication system may comprise another type of cellular telephony network, such as, for example, TDMA or GSM. Additionally, any other type of wide area wireless networking technologies may be used, for example, WiMAX (802.16), TDNM, OFDM, GPRS, EV-DO, S02.xx, UWB, LTE, and/or $5^{th}$ Generation (5G).

The UE 100 may also include a WLAN component 110 that may be connected to one or more antennas 102. The WLAN component 110 may include suitable components, hardware, and/or software for communicating with and/or detecting signals to/from a network entity such as an access point, and/or directly with other wireless devices (e.g., UEs) within a communication network. In an aspect, the WLAN component 110 may include a Wi-Fi (e.g., IEEE 802.11a/ ac/b/g/h/n, IEEE 802.16, and/or IEEE 802.20) communication system suitable for communicating with one or more wireless access points; however in other aspects, the WLAN component 110 may include another type of local area network, e.g., a personal area network.

In some aspects, the UE 100 may include a GPS component 108 that may be connected to one or more antennas 102. The GPS component 108 may include suitable devices, hardware, and/or software for receiving and processing satellite signals. Further, the UE 100 may include a Bluetooth component 106 that may be connected to one or more antennas 102 for receiving/transmitting signals according to IEEE 802.15. The Bluetooth component 106 may include suitable devices, hardware, and/or software for receiving and processing Bluetooth signals. Additionally, any other type of wireless networking technologies may be used, for example, ZigBee.

Further, in some aspects, the UE 100 may include one or more sensors configured to detect, determine, or otherwise acquire information related to one or more physical properties. For example, the UE 100 may include a light sensor 140 that may be connected to one or more components of the UE 100 such as, but not limited to, the processor 112 and/or the memory 114. Additionally, the UE 100 may include proximity sensor 142 that may be connected to one or more components of the UE 100 such as, but not limited to, the processor 112 and/or the memory 114. In addition, the UE 100 may include one or more cameras 144 that may be connected to one or more components of the UE 100 such as, but not limited to, the processor 112 and/or the memory 114. Further, the UE 100 may include an accelerometer 146 that may be connected to one or more components of the UE 100 such as, but not limited to, the processor 112 and/or the memory 114. Moreover, the UE 100 may include a gyroscope 148 that may be connected to one or more components of the UE 100 such as, but not limited to, the processor 112 and/or the memory 114. Additionally, a microphone 132 and/or a speaker 133 may be or otherwise act as a voice sensor.

The UE 100 may also include a processor 112. The processor 112 may be connected to the WWAN component 104, the Bluetooth component 106, the GPS component 108, and the WLAN component 110. The processor 112 may include one or more microprocessors, microcontrollers, and/or digital signal processors that provide processing functions, as well as other calculation and control functionality. The processor 112 may communicate, or in some non-limiting aspects include a memory 114 for storing data and software instructions for executing programmed functionality within the UE 100. In some aspects, the memory 114 may be on-board the processor 112 (e.g., within the same IC package), and/or the memory 114 may be external memory that is functionally coupled to the processor 112 over a data bus.

In some aspects, the memory 114 may include any type of computer-readable medium usable by a computer or the processor 112, such as random access memory (RAM), read only memory (ROM), tapes, magnetic discs, optical discs, volatile memory, non-volatile memory, and any combination thereof. In an aspect, for example, the memory 114 may be a computer-readable storage medium (e.g., a non-transitory medium) that stores computer-executable code. The computer-executable code may define one or more operations or functions of the authenticator 120 and/or one or more of the subcomponents, and/or data associated therewith. Further, each of the WWAN component 104, the Bluetooth component 106, the GPS component 108, the WLAN component 110, the light sensor 140, the proximity sensor, the one or more cameras 144, the accelerometer 146, and/or the gyroscope 148 may include hardware, firmware, and/or software and may be configured to execute code or perform instructions stored in a memory 114 (e.g., a computer-readable storage medium).

A number of software modules and/or applications may reside in the memory 114 and be utilized by the processor 112 and/or other components of the UE 100 in order to manage communications and/or services. Although not illustrated, the memory 114 may include a number of applications. The organization of the memory contents as shown in FIG. 1 is for purposes of illustration and not limitation, and as such the functionality of the modules and/or data structure may be combined, separated, and/or be structured in different ways depending upon the implementation of the UE 100.

Further, the processor 112 may include any form of logic suitable for performing at least the techniques provided herein. For example, the processor 112 may be operatively configurable based on instructions in the memory 114 to selectively initiate one or more routines and/or applications.

The UE 100 may include a user interface 130 which may be configured to provide any suitable interface systems, such as the microphone 132, the speaker 133, a set of buttons/keys 134, a display 136, and/or a biometric sensor 138 that allows user interaction with the UE 100. The microphone 132 and/or the speaker 133 may be configured to provide for voice communication services using one or more of the WWAN component 104, the Bluetooth component 106, and/or the WLAN component 110. The buttons/keys 134 may include any suitable buttons for user input, which may also include other external hardware inputs of the UE 100. In some aspects, the buttons/keys may be in the form of a keypad. The display 136 may include any suitable display, such as, for example, a backlit LCD display, and may further include a touch screen/sensitive display for additional user input modes. For instance, the display 136 may be a capacitive sensing mechanism, or a multi-touch capacitive sensing mechanism.

Additionally, the biometric sensor 138 may be configured to detect and/or capture physiological and/or behavioral data of a user for authentication. For example, in some aspects, biometric sensor 138 may correspond to a fingerprint sensor, which may be configured to detect and/or capture data (e.g., digital image) of a fingerprint pattern. In some aspects, fingerprint sensor may be included as part of display 136. Further, for instance, fingerprint sensor may be embedded in a portion of display 136 (e.g., within a portion that may include a capacitance sensing component, a light source, and a display surface). Additionally, for example, fingerprint sensor may be placed underneath the display 136. In yet another example, fingerprint sensor may include an existing component of the portion of the display 136 (e.g., the display 136 for a touch screen display may include a capacitance sensor).

In some aspects, the biometric sensor 138 may correspond to at least one of an iris sensor/scanner, a retina sensor/scanner, a facial recognition sensor/scanner, and/or speech/voice recognition sensor. For example, the retina sensor/scanner may be configured to recognize and/or capture (e.g., using camera 144) one or more unique patterns/characteristics of a user's retina. Further, for instance, the iris sensor/scanner may be configured to capture one or more images (e.g., via camera 144) of one or both of a user's irises to identify unique features/characteristic for user authentication. Further, the facial recognition sensor/scanner may be configured to capture one or more images (e.g., via camera 144) of a user's facial features. Additionally, the speech/voice recognition sensor may be configured to capture (e.g., via microphone 132) one or more spoken words or phrases by a user for authentication.

In such an approach, the authentication system may use the detected output of a capacitance sensing component of the portion of the display 136 (e.g., in a touch screen display) that has a sufficient resolution for distinguishing ridges and valleys of a user's skin. In some aspects, the capacitance sensing component of the portion of the display 136 may include several types or densities of capacitance sensing components to allow for authentication using particular portions of the display 136. Further, biometric sensor 138 may include any suitable biometric sensor such as, for example, a capacitive fingerprint reader. Biometric sensor 138 may be embedded in the UE 100 such that it is not visible in display 136. For example, biometric sensor 138 may be assembled, printed or etched directly on display 136 (e.g., etched on a glass material) such that the user cannot see the biometric sensor 138.

The UE 100 may also include the authenticator 120, which may be configured to authenticate a user prior to unlocking the UE 100 based on at least a two-factor authentication scheme. Some UEs may provide a single factor form of authentication in accessing an unlocked state, for example, prior to unlocking the UE 100, namely scanning a user's finger on the biometric sensor 138. While such form of authentication may be secure and adequately authenticate or verify a user's identity prior to providing access to the unlocked state of UE 100, the single factor form of authentication may nonetheless suffer from some drawbacks such as spoofing or hacking by an unauthorized individual.

As such, the present aspects provide, for example, an authenticator 120, which may be configured to verify both a fingerprint scan 122 using the biometric sensor 138 in tandem or concurrently with an authentication pattern characteristic 126 of an authentication pattern 124. In some aspects, the authentication pattern 124 may correspond to at least one of a visual timer, a visual color pattern, a visual shape pattern, and/or a swipe/scan direction of the finger on the biometric sensor 138. As such, the authenticator 120 may be configured to securely authenticate a user based on the fingerprint scan 122 of the user using the biometric sensor 138 in tandem or concurrently with an authentication pattern characteristic 126, e.g., a visual timer, a visual color pattern, a visual shape pattern, and/or a swipe/scan direction pattern of the finger on the biometric sensor 138.

Specifically, to authenticate or otherwise verify an authorized user's identity and transition the UE 100 from a locked state to an unlocked state, the authenticator 120 may be configured to receive, while the UE 100 is in the locked state, a first input representing a fingerprint scan 122 via the biometric sensor 138. Further, to provide an added level of security and minimize spoofing or hacking of the UE 100, the authenticator 120 may be configured to display an authentication pattern 124 in response to receiving the first input and while continuing to detect a user's finger on the biometric sensor 138.

The authenticator 120 may further be configured to receive a second input representing a detection of a removal of the user's finger from the biometric sensor 138. Additionally, the authenticator 120 may be configured to determine an authentication pattern characteristic 126 of the authentication pattern 124 in response to the detection of the removal of the user's finger from the biometric sensor 138. In some aspects, the authentication pattern characteristic 126 may be a displayed attribute of the authentication pattern 124 (e.g., visual timer, visual color pattern, visual shape pattern, and/or swipe/scan direction) at a given moment in time. That is, the authentication pattern 124 may possess dynamic characteristics, and as such, the authentication pattern characteristic 126 may be one or more of such dynamic characteristics at a moment in time corresponding to a removal or liftoff of a user's finger from the biometric sensor 138.

In addition, upon obtaining both the fingerprint scan 122 and the authentication pattern characteristic 126 of the authentication pattern 124, the authenticator 120, via two factor determiner 128, may be configured to determine whether the fingerprint scan 122 matches or corresponds to a stored fingerprint scan 152 and whether the authentication pattern characteristic 126 of the authentication pattern 124 matches or corresponds to a stored authentication pattern characteristic 156. Accordingly, based on determining that fingerprint scan 122 matches or corresponds to the stored fingerprint scan 152 and the authentication pattern characteristic 126 matches or corresponds to the stored authentication pattern characteristic 156, the authenticator 120 may be configured to trigger an unlock state of the UE 100. Otherwise, the authenticator 120 may be configured to maintain a locked state based on determining that either the fingerprint scan 122 fails to match or does not correspond to the stored fingerprint scan 152 or the authentication pattern characteristic 126 does not correspond to the stored authentication pattern characteristic 156.

In some aspects, the authentication pattern 124 may be or otherwise correspond to a visual timer. In such aspect, the UE 100 may be configured to display (e.g., show visually), on the display 136, a visual timer having a visual indicator advance from a start time to an end time. In some aspects, the visual indicator may be a vertical bar that moves across the display 136 from a first time to an end time. Further, in some aspects, the visual indicator may be an increasing rectangular area that may have minimal area at the first time yet increases as time passes. That is, the left side of the rectangular area remains fixed while the right side moves to the right as time passes. For example, the start time and the end time may form a total duration of time in seconds where the start time is less than the end time in some aspects, and greater than the end time in additional aspects.

Further, in such aspect, the authentication pattern characteristic 126 may be or correspond to a timer value corresponding to a location of the visual indicator between the start time and the end time representing the detection of the removal of the finger from the biometric sensor 138. Accordingly, to authenticate a user, the authenticator 120 may be configured to determine whether the timer value falls within a first selected time value and a second selected time value. In some aspects, the first selected time value may be greater than or equal to the start time and the second selected time value may be greater than the first selected time value and less than or equal to the end time. As an example of the visual timer, the authenticator 120 may be configured to unlock the UE 100 based on a holding time of the biometric sensor 138, where in some aspects, the holding time may correspond to the timer value at the moment the user removes their finger from the biometric sensor 138.

Additionally, the authentication pattern 124 may be or otherwise correspond to a visual color sequence having at least a first color associated with a first portion and a second color associated with a second portion. For example, in displaying the visual color sequence on the display 136, the UE 100 may be configured to progress or advance a visual indicator from the first portion of the display 136 to the second portion of the display 136 to reveal an associated color within at least one of the first portion or the second portion. In some aspects, the first portion may be adjacent to the second portion and the first color may be different from the second color. In some aspects, the first portion may not border or be adjacent to the second portion and the first color may be different from the second color. In some aspects, the display may be partitioned into multiple areas (e.g., 1×3, 1×4, 2×2, 2×3, 2×4, 3×3, 3×4, 4×4, etc.). Further, multiple colors may be presented in the various partitions such that a match may be determined when one or more certain colors are present in the corresponding partitions.

Further, the UE 100 may be configured to display the visual color sequence sequentially or randomly. In particular, the UE 100 may be configured to sequentially display, on the display 136, the first color for a first period of time and the second color for a second period of time equal to or different from the first period of time. In addition, the authentication pattern characteristic 126 may be or correspond to a color displayed during the removal of the finger from the biometric sensor 138. As such, the authenticator 120 may be configured to determine whether the color corresponds to a pre-selected color. As an example of the visual color sequence, the authenticator 120 may be configured to unlock the UE 100 based on the user's finger being held on the biometric sensor 138 until a pre-selected color is displayed on the display 136, upon which time a removal or liftoff of the user's finger from the biometric sensor 138 is detected prior to the color changing. That is, the finger may remain on the biometric sensor 138 until a pre-selected color is detected in the right segment and is removed prior to the segment color changing.

In some aspects, the authentication pattern 124 may be or otherwise correspond to a visual shape pattern. For instance, UE 100 may be configured to display a number of shapes within one or more portions of the display 136. In some aspects, each of the number of shapes may be displayed either sequentially or randomly for a duration of time within the one or more portions of the display 136. Further, the duration of time may be the same for each shape displayed or may be different for each displayed shape. Additionally, in some aspects, the one or more portions of the display include two or more portions of the display 136. The two or more portions may share a border or may be separated by a distance.

Further, the authentication pattern characteristic 126 may be or otherwise correspond to at least one shape (e.g., an object, polygon, and/or image) of the number of shapes (e.g., an object, polygon, and/or image) displayed within a portion from the one or more portions of the display 136. As such, to authenticate a user, the authenticator 120, via the two factor determiner 128, may be configured to determine whether the at least one shape positioned at the portion of the display 136 corresponds to a pre-selected shape positioned at a pre-selected portion of the display 136. As an example of the visual shape sequence, the authenticator 120 may be configured to unlock the UE 100 based on holding the biometric sensor 138 until a pre-selected shape is displayed on a portion of the display 136, upon time detecting a removal or liftoff of the user's finger from the biometric sensor 138. In some aspects, the partitioning of the display 136 may be similar to that described above for color. Further, more than one shape or object may be matched with each shape or object in the correct partition as part of the authentication. Additionally, the authentication pattern 124 may be associated with the stored fingerprint scan 152 so that different authorized users may have different authentication patterns.

Further, the authenticator 120 may be configured to establish a preferred authentication pattern 124 to be used in conjunction with or in tandem with a sensing of a fingerprint using the biometric sensor 138. In particular, the authenticator 120 may be configured to receive an input via buttons/keys 134 and/or the display 136 when in the form of a touch-sensitive display, representing a selection of the authentication pattern 124 for configuration. That is, the authenticator 120 may be configured to display at least one of the authentication pattern(s) 124 (e.g., visual timer, visual color pattern, visual shape pattern, and/or scan swipe direction) for user selection. The authenticator 120 may be configured to receive a subsequent input representing a selection of at least one of the authentication pattern(s) 124 for configuration. Further, the authenticator 120 may configure one or more parameters corresponding to stored authentication pattern characteristic 156 of the selected authentication pattern 124 based on receiving one or more selections or input representing such selection from the user.

For example, in some aspects where the authentication pattern 124 corresponds to the visual timer, the UE 100 may be configured to receive the first selected time value and the second selected time value based on an input by the user. In some aspects, the first selected time value and the second selected time value may correspond to the stored authentication pattern characteristic 156. Further, for instance, with regard to the visual color pattern, the UE 100 may be configured to receive the UE 100 may be configured to receive one or more selected colors based on an input by the user. In some aspects, the one or more selected colors may correspond to the stored authentication pattern characteristic 156.

Additionally, with regard to the visual shape pattern, the UE 100 may be configured to receive one or more selected shapes, symbols, and/or polygons based on a user input. In some aspects, the selected shapes, symbols, and/or polygons may correspond to the stored authentication pattern characteristic 156. Moreover, with regard to the scan swipe direction, the UE 100 may be configured to receive one or more scan swiping directions based on a user input. In some aspects, the scan swipe direction corresponds to the stored authentication pattern characteristic 156.

As such, upon the user selecting and configuring the particular authentication pattern 124 (e.g., visual timer, visual color pattern, visual shape pattern, and/or scan swipe direction), the authenticator 120 may be configured to send or otherwise store the user data 150 including the stored authentication pattern characteristic 156 in a secure location of the memory 114. In some aspects, the authenticator 120 may be further be configured to store and associate with the stored authentication pattern characteristic 156 with the corresponding stored fingerprint scan 152.

Further, in some aspects, the authenticator 120 may be configured to authenticate or verify an authorized user's identity based on a user's fingerprint scan 122 as well as, or in tandem with, a swipe direction of the user's finger or fingerprint scan 122. That is, the biometric sensor 138, in addition to obtaining the fingerprint scan 122, may also obtain or determine a swipe or movement direction of a finger during sensing/scanning. As such, the fingerprint scan 122 may be associated with a scan direction.

In an example, the authenticator 120 may unlock the UE 100 based on at least sequence of a swiping directions of a finger on the biometric sensor 138. In particular, the authenticator 120 may be configured to receive a first input representing a detection of a first fingerprint scan by the biometric sensor 138 in a first direction. Further, the authenticator 120 may be configured to receive a second input representing a detection of a second fingerprint scan by a biometric sensor 138 in a second direction (e.g., which may be different from the first direction).

In addition, the authenticator 120 may be configured to determine whether the first fingerprint scan and the second fingerprint scan correspond to at least one stored fingerprint scan and whether the first direction and the second direction correspond to a pre-selected sequence of fingerprint scanning directions associated with the stored fingerprint scan. As such, the authenticator 120 may be configured to trigger an unlock state in accordance with a determination that first fingerprint scan and the second fingerprint scan correspond to at least one stored fingerprint scan and the first direction and the second direction correspond to the fingerprint scanning direction pattern.

Otherwise, the authenticator 120 may be configured to maintain the locked state in accordance with a determination that first fingerprint scan and the second fingerprint scan do not correspond to at least one stored fingerprint scan or the first direction and the second direction do not correspond to the fingerprint scanning direction pattern. As such, when the configured combination of fingerprint scanning directions and the corresponding fingerprint matches, the UE 100 may transition to an unlock state.

As used herein, the UE 100 may be any portable or movable device that is configurable to acquire wireless signals transmitted from, and transmit wireless signals to, one or more wireless communication devices or networks. As shown in FIG. 1, the UE 100 may be representative of such a portable wireless device. Thus, by way of example but not limitation, the UE 100 may include a radio device, a cellular telephone device, a computing device, a personal communication system (PCS) device, or other like movable wireless communication equipped device, appliance, or machine. The term "user equipment" is intended to include all devices, including wireless devices, computers, laptops, etc. which are capable of communication with a server, such as via the Internet, Wi-Fi, or other network. The term "user equipment" is also intended to include devices which communicate with a personal navigation device, such as by short-range wireless, infrared, wire line connection, or other connection. Any operable combination of the above is also considered a "user equipment." Further, as used herein, the terms "wireless device," "mobile station," "mobile device," "user equipment," etc. may refer to any type of wireless communication device which may transfer information over a network. The wireless device may be any cellular mobile terminal, personal communication system device, personal navigation device, laptop, personal digital assistant, smart phone, tablet, or any other suitable device capable of receiving and processing network signals.

Figure 2:
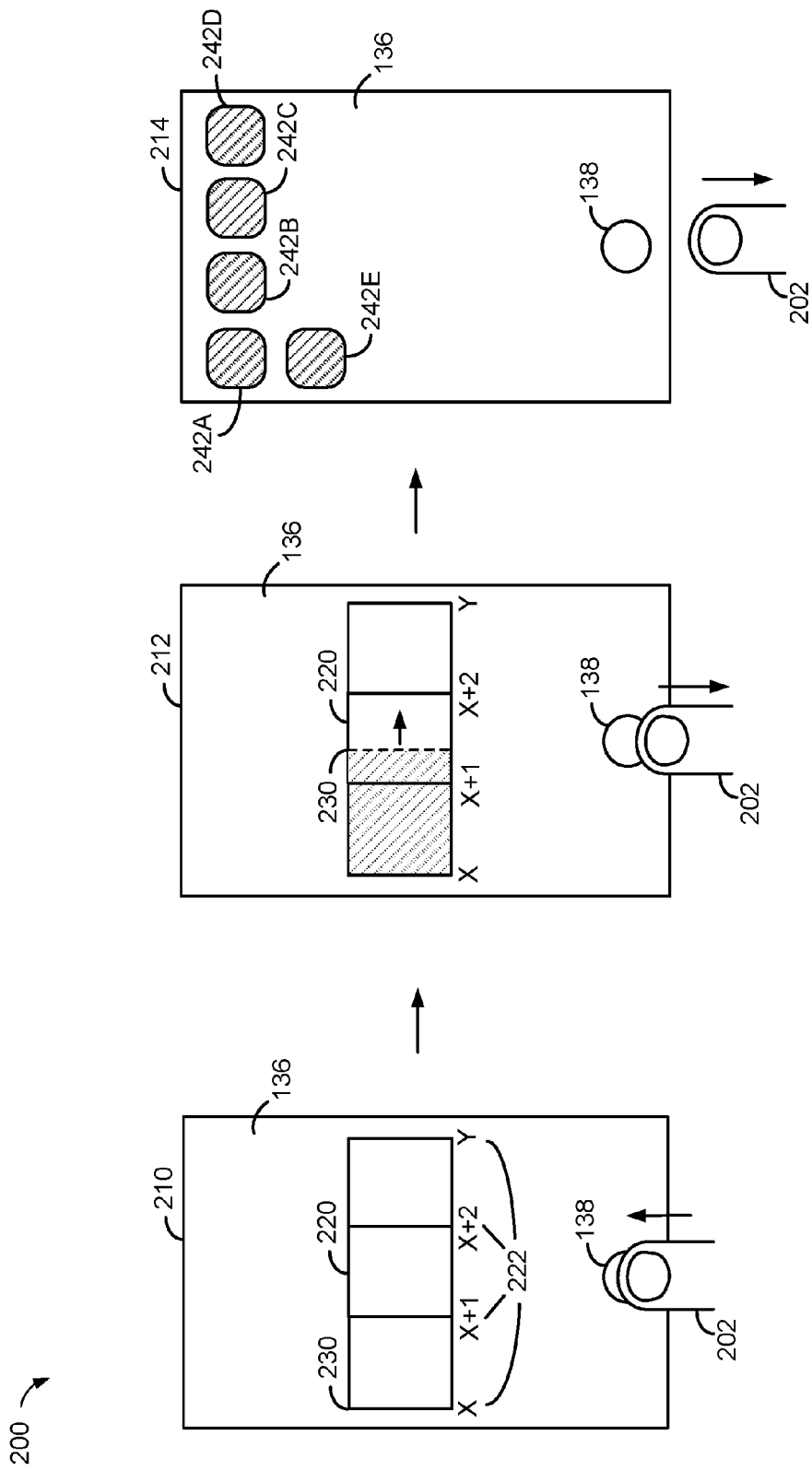
FIG. 2 is a conceptual diagram of various user interfaces displayed on a UE to authenticate a user according to a visual timer in accordance with some aspects of the present disclosure.

FIG. 2 is a conceptual diagram 200 illustrating various user interfaces 210, 212, and 214 that may be displayed on the display 136 of the UE 100 (FIG. 1) as part of a user authentication procedure using a visual timer in accordance with some aspects of the present disclosure. In some aspects, the user interfaces 210, 212, and/or 214 are shown to include the biometric sensor 138 embedded as part of the display 136, which in some aspects, may take the form of a fingerprint sensor. However, in some aspects, the biometric sensor 138 may be operatively connected to the display 136 (e.g., via processor 112, FIG. 1), yet separate from the display 136.

As illustrated in user interface 210, UE 100 may detect a scan of a finger 202 on the biometric sensor 138. Upon such detection, and while the biometric sensor 138 continues to detect the finger 202 on the biometric sensor 138 (e.g., user maintains finger 202 on the biometric sensor 138), the display 136 may display an authentication pattern 124 in the form of or corresponding to a visual timer 220 having a number of equal or unequal time intervals 222, beginning from a start time X, proceeding to X+1, X+2, and terminating at an end time Y.

Further, visual timer 220 may include a visual indicator 230 that advances from the start time X to the end time Y. As such, upon detecting the fingerprint scan, and/or while continuing to detect the fingerprint scan, or the finger 202 on the biometric sensor 138, the visual indicator 230 may be initiated to progress or advance from the start time X towards the end time Y to provide a visual indication of the time elapsed since the beginning of the visual timer 220. In some aspects, the start time X and the end time Y may form a total duration of time in a unit of time (e.g., milliseconds, seconds, etc.). Further, in some aspects, the start time X may be less or greater than the end time Y. In addition, the visual indicator 230 may be a vertical bar of a fixed size that advances across the display 136 or may be a shaded area that increases in size as time increases/advances.

Additionally, the UE 100 may detect a removal of the finger 202 from the biometric sensor 138, for example, as shown in user interface 212. Specifically, user interface 212 illustrates an aspect where the visual indicator 230 of the visual timer 220 is between time X+1 and time X+2 at the moment UE 100 detects the removal or liftoff of the finger 202 from biometric sensor 138. As such, in this instance, the authentication pattern characteristic 126 (FIG. 1) may correspond to a timer value corresponding to a location of the visual indicator 230 between the start time X and the end time Y.

Accordingly, upon detecting the removal of the finger 202 from the biometric sensor 138, the UE 100 may determine whether the timer value falls within a first selected time value and a second selected time value. In such aspect, the first and second selected time values are values selected or configured and known by the user. Further, for example, the first selected time value may be greater than or equal to the start time and the second selected time value may be greater than the first selected time value and less than or equal to the end time. In an example, the first selected time value may be X+1 and the second selected time value may be X+2.

Hence, a timer value corresponding to the location of the visual indicator 230 on the visual timer 220 may be obtained/determined in addition to a capturing of a fingerprint scan 122 (FIG. 1) of the finger 202. As such, a user may be authenticated and the UE 100 may transition from a locked state to an unlocked state, as shown in user interface 214, when the fingerprint scan 122 matches a stored/authorized fingerprint scan 152 (FIG. 1) and the timer value falls within the first selected time value may be X+1 and the second selected time value may be X+2. In some aspects, the unlocked state of the UE 100 may present for display a previous screen state of the UE 100, or a home screen of the UE 100 including, for example, one or more application program icons 242A-242E.

Figure 3:
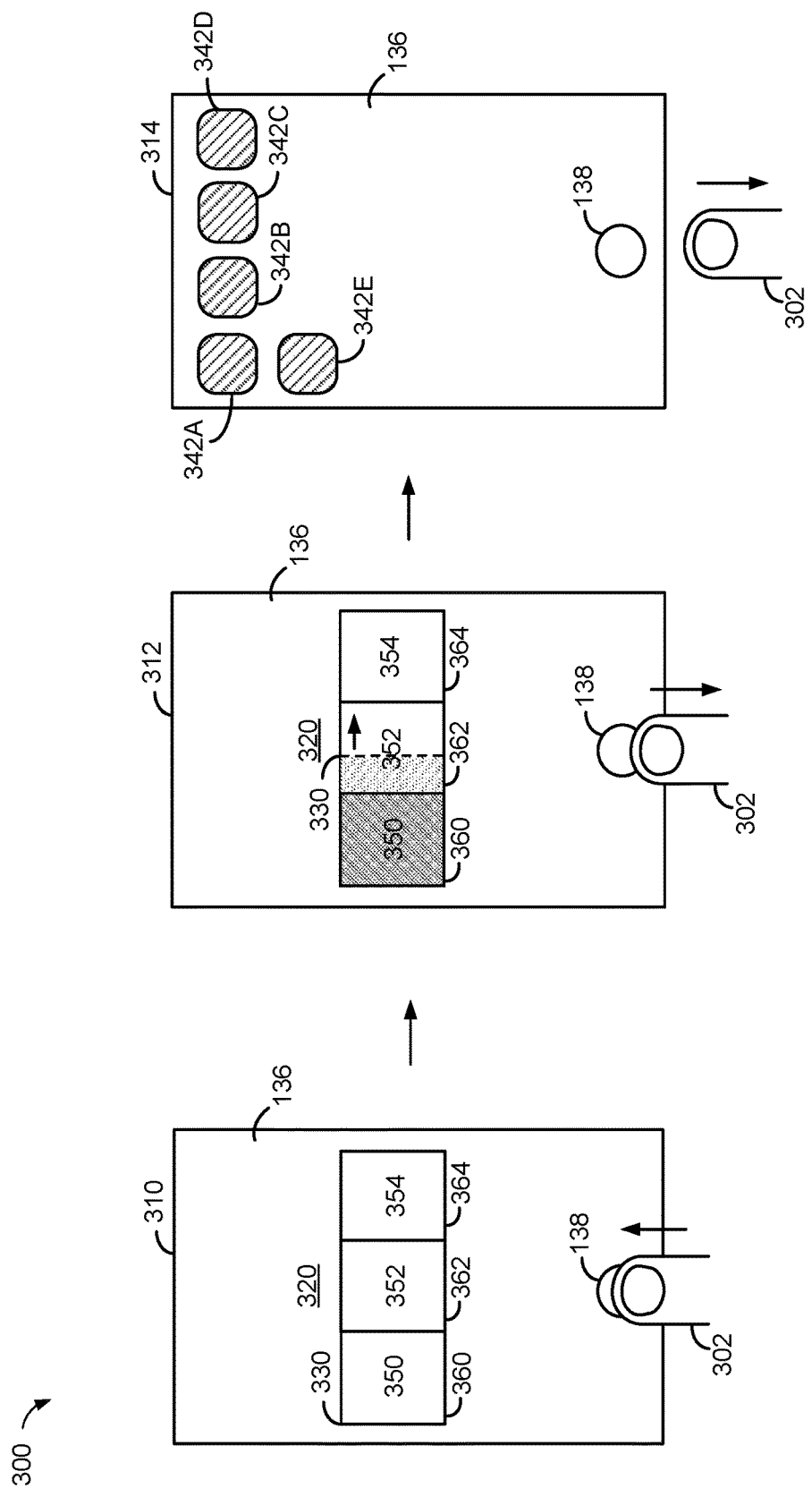
FIG. 3 is a conceptual diagram of various user interfaces displayed on a UE to authenticate a user according to a visual color pattern in accordance with some aspects of the present disclosure.

FIG. 3 is a conceptual diagram 300 illustrating various user interfaces 310, 312, and 314 that may be displayed on the display 136 of the UE 100 (FIG. 1) as part of a user authentication procedure using a visual color pattern in accordance with some aspects of the present disclosure. In some aspects, the user interfaces 310, 312, and/or 314 are shown to include the biometric sensor 138 embedded as part of the display 136, which in some aspects, may take the form of a fingerprint sensor. However, in some aspects, the biometric sensor 138 may be operatively connected to the display 136 (e.g., via processor 112, FIG. 1), yet separate from the display 136.

As illustrated in user interface 310, UE 100 may detect a scan of a finger 302 on the biometric sensor 138. Upon such detection, and while the biometric sensor 138 continues to detect the finger 302 on the biometric sensor 138 (e.g., user maintains finger 302 on the biometric sensor 138), the display 136 may display an authentication pattern 124 in the form of or corresponding to a visual color sequence 320 having one or more distinct colors associated with respective portions of the display 136.

However, the one or more distinct colors may not be displayed until the detection of the scan of the finger 302. For instance, as shown in user interface 310, a first portion 350 of the display 136 may be designated for a first color 360, a second portion 352 of the display 136 may be designated for a second color 362, and/or a third portion 354 of the display 136 may be designated for the third color 364. As such, as shown in user interface 310, visual color sequence 320 may represent an outline of one or more areas or portions in which a corresponding color may be displayed as a visual indicator 330 advances from a start position (e.g., one edge of visual color sequence 320) to an end position (e.g., opposite edge of visual color sequence 320).

As such, upon detecting the fingerprint scan, and/or while continuing to detect the fingerprint scan, or the finger 302 on the biometric sensor 138, the visual indicator 330 may be initiated to progress or advance from an edge of the first portion 350, through the second portion 352, and to an edge of the third portion 354, to reveal an associated color within each portion as the visual indicator 330 advances. However, in some aspects, not every portion may display a corresponding color during the authentication procedure.

That is, as shown in user interface 312, while the visual indicator 330 advances from one portion to another, or more specifically, through the second portion 352, revealing the second color 362, the UE 100 may detect a removal or liftoff of the finger 302 from the biometric scanner 138 prior to the visual indicator 330 reaching the third portion 354 and/or beginning to reveal the third color 364. In some aspects, rather than using visual indicator 330 to reveal the colors corresponding to each portion, UE 100 may sequentially or randomly fill in or display, within the entire respective portion, a corresponding color.

As an example, in user interface 312, UE 100 may display first color 360 within an entirety of first portion 350, pause for a predetermined amount of time, and then display second color 362 within an entirety of the second portion 352, and pause for the predetermined or another amount of time before doing the same in the third portion 354 with third color 364. As such, the predetermined amount of time provided between the displays of the colors provides the user a sufficient period of time to remove the finger 302 from the biometric sensor 138 when the pre-selected color appears within, in some aspects, the pre-selected portion of the display.

Additionally, the UE 100 may detect a removal of the finger 302 from the biometric sensor 138, for example, as shown in user interface 312. Specifically, user interface 312 illustrates an aspect where the visual indicator 330 of the visual color sequence 320 is within the second portion 352, and hence displaying the second color 362, at the moment UE 100 detects the removal or liftoff of the finger 302 from biometric sensor 138. In this instance, the authentication pattern characteristic 126 (FIG. 1) may correspond to a color (e.g., second color 362) displayed and/or being revealed by the visual indicator 330 during the removal of the finger 302 from the fingerprint sensor.

Accordingly, upon detecting the removal of the finger 302 from the biometric sensor 138, the UE 100 may determine whether the color (e.g., second color 362) corresponds to a pre-selected color (e.g., selected by the user during configuration of the authentication pattern). A user may be authenticated and the UE 100 may transition from a locked state to an unlocked state, as shown in user interface 314, when the fingerprint scan 122 matches a stored/authorized fingerprint scan 152 (FIG. 1) and the displayed and/or revealed color matches or corresponds to the pre-selected color (e.g., color stored in memory 114, FIG. 1). In some aspects, the unlocked state of the UE 100 may present for display a previous screen state of the UE 100, or a home screen of the UE 100 including, for example, one or more application program icons 342A-342E. In some aspects, the color may be within a particular segment of the display where the display has multiple segment configurations.

In some aspects, the first portion 350, the second portion 352, and the third portion 354 may be adjacent to each other. Further, in some aspects, the first color 360, the second color 362, and the third color 364 may be different from each other. In some aspects, the first portion 350, the second portion 352, and the third portion may not border or be adjacent to each other. Further, in some aspects, the colors may be displayed sequentially or in a randomized manner each for the given period of time, which may be the same or different for each color.

Figure 4:
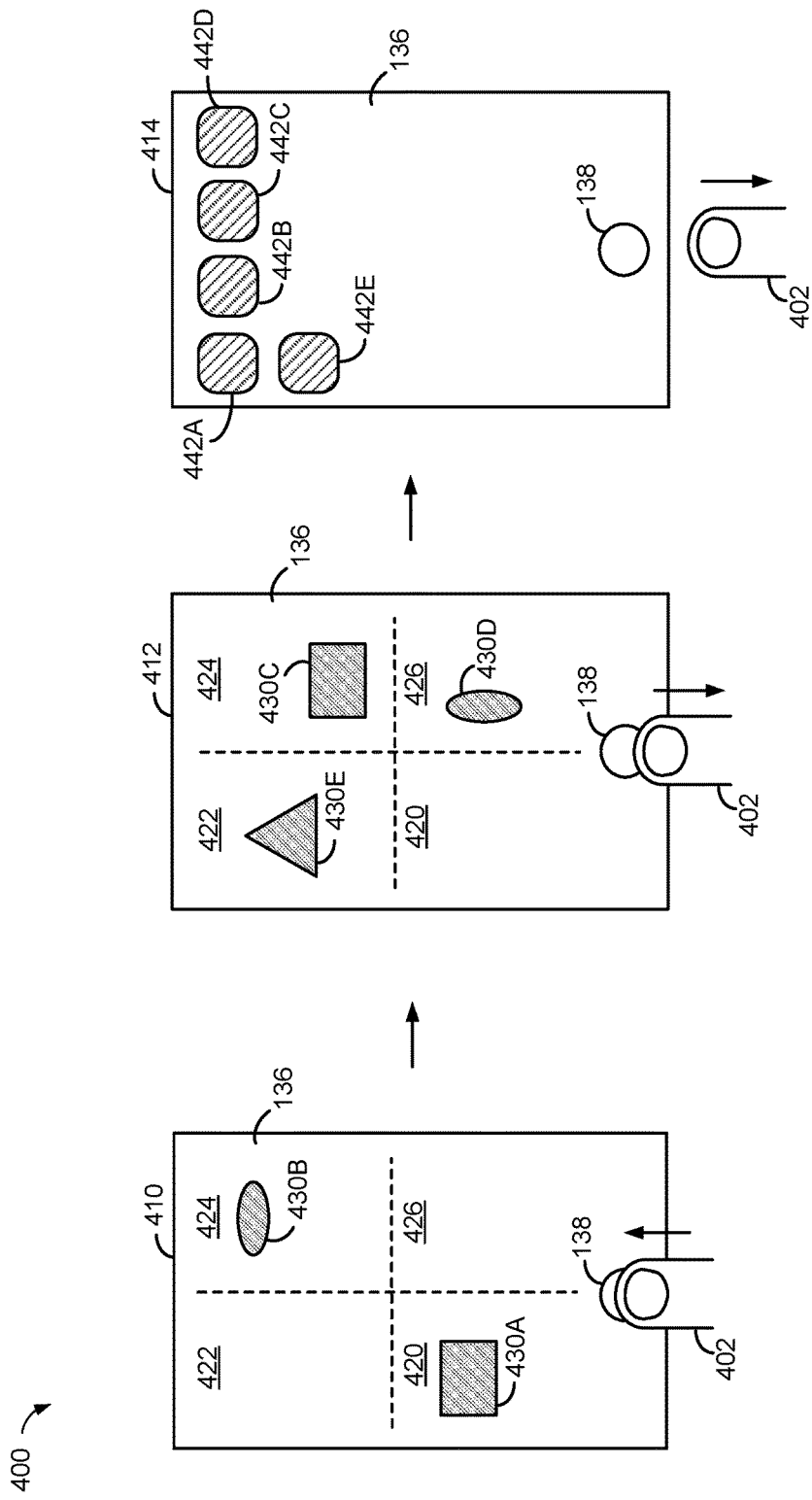
FIG. 4 is a conceptual diagram of various user interfaces displayed on a UE to authenticate a user according to a visual shape pattern in accordance with some aspects of the present disclosure.

FIG. 4 is a conceptual diagram 400 illustrating various user interfaces 410, 412, and 414 that may be displayed on the display 136 of the UE 100 (FIG. 1) as part of a user authentication procedure using a visual shape pattern in accordance with some aspects of the present disclosure. In some aspects, the user interfaces 410, 412, and/or 414 are shown to include the biometric sensor 138 embedded as part of the display 136. However, in some aspects, the biometric sensor 138 may be operatively connected to the display 136 (e.g., via processor 112, FIG. 1), yet separate from the display 136.

As illustrated in user interface 410, UE 100 may detect a scan of a finger 302 on the biometric sensor 138. Upon such detection, and while the biometric sensor 138 continues to detect the finger 402 on the biometric sensor 138 (e.g., user maintains finger 402 on the biometric sensor 138), the display 136 may initiate display of an authentication pattern 124 in the form of or corresponding to a visual shape sequence including a number of shapes within one or more portions 420, 422, 424, and/or 426 of the display 136. Specifically, the one or more portions may include first portion 420, second portion 422, third portion 424, and/or fourth portion 426.

Further, for example, UE 100 may display on the display 136 a number of shapes 430A-430E each for a duration of time within the one or more portions 420, 422, 424, and/or 426 of the display 136. User interface 410 displays an initial sequence of shapes displayed on the display 136 upon a detection of a scan of the finger 402 by the biometric sensor 138. For instance, user interface 410 may initially display the shape 430A and the shape 430B sequentially or in random order within the first portion 420 and the third portion 424, respectively, for a defined period of time.

In some aspects, after detecting a scan of the finger and/or fingerprint, one or more shapes may be displayed in, for example, half a millisecond to one second intervals. The interval and/or appearance of the shape pattern may be configurable by user. Further, a pre-selected shape may appear or otherwise be randomly displayed in combination with or as part of a sequence with at least a first number of other non-selected shapes. In some aspects, if a user fails to select or indicate match a first period of time, then the displayed non-selected shapes may be reduced to a second number less than the first number. Additionally, if the user fails again to select or otherwise indicate a match, the UE 100 may display an alternate authentication procedure, such as, but not limited to, a passcode entry. In some aspects, the pattern may have the same shape repeated for display (e.g., in some cases simultaneously).

As the UE 100 continues to detect the user's finger 402 on the biometric sensor 138, or in other words, the biometric sensor 138 continues to detect or scan the user's finger 402 on the biometric sensor 138 after the initial detection resulting in the display of the visual shape sequence on user interface 410, the user interface 412 may continue to display the visual shape sequence with the shape 430E in the second portion 422, the shape 430C in the third portion 424, and the shape 430D in the fourth portion 426, sequentially or in a randomized manner. Further, each shape may be displayed for a defined period of time, which may be the same or different for each shape. As such, each shape may be displayed for the same amount of time, or may be displayed for different durations.

Further, during display of the visual shape sequence as part of user interface 412, the UE 100 may detect a removal of the finger 402 from the biometric sensor 138, for example, as shown in user interface 412. A removal of the finger 402 from the biometric sensor 138 indicates that the user has observed the pre-selected shape in a pre-selected portion of the display 136. In this case, for example, shape 430E within the second portion 422 may correspond to the pre-selected shape within the pre-selected portion or region of the display 136. As such, the authentication pattern characteristic 126 (FIG. 1) may correspond to at least one shape (e.g., shape 430E) of the number of shapes displayed within a portion (e.g., second portion 430E) from the one or more portions of the display 136 at the moment or instance of detecting a removal or liftoff of the user's finger 402 from the biometric sensor 138.

Accordingly, upon detecting the removal of the finger 402 from the biometric sensor 138, the UE 100 may determine whether the at least one shape (e.g., shape 430E) positioned at the portion/segment (e.g., second portion 422) of the display corresponds to or matches a pre-selected shape positioned at a pre-selected portion/segment (e.g., as selected by the user). A user may be authenticated and the UE 100 may transition from a locked state to an unlocked state, as shown in user interface 414, when the fingerprint scan 122 matches a stored/authorized fingerprint scan 152 (FIG. 1) and the at least one shape (e.g., shape 430E) positioned at the portion (e.g., second portion 422) of the display corresponds to or matches a pre-selected shape positioned at a pre-selected portion. In some aspects, the unlocked state of the UE 100 may present for display a previous screen state of the UE 100, or a home screen of the UE 100 including, for example, one or more application program icons 442A-442E.

In some aspects, the shapes 430A-430E may be displayed in a specific sequence or in a randomized manner within the one or more portions 420, 422, 424, and/or 426 of the display 136. Further, in some aspects, although four portions are illustrated in FIG. 4, two or more portions may be used to display the shapes. Further, the two or more portions 420, 422, 424, and/or 426 of the display 136 may share a border or are separated by a distance. Additionally, in some aspects, two or more shapes may be displayed within a single portion of the display 136. As an example, shapes 430B and 430C may be displayed, at least for a portion of the total time each are displayed, within the third portion 424.

Figure 5A:
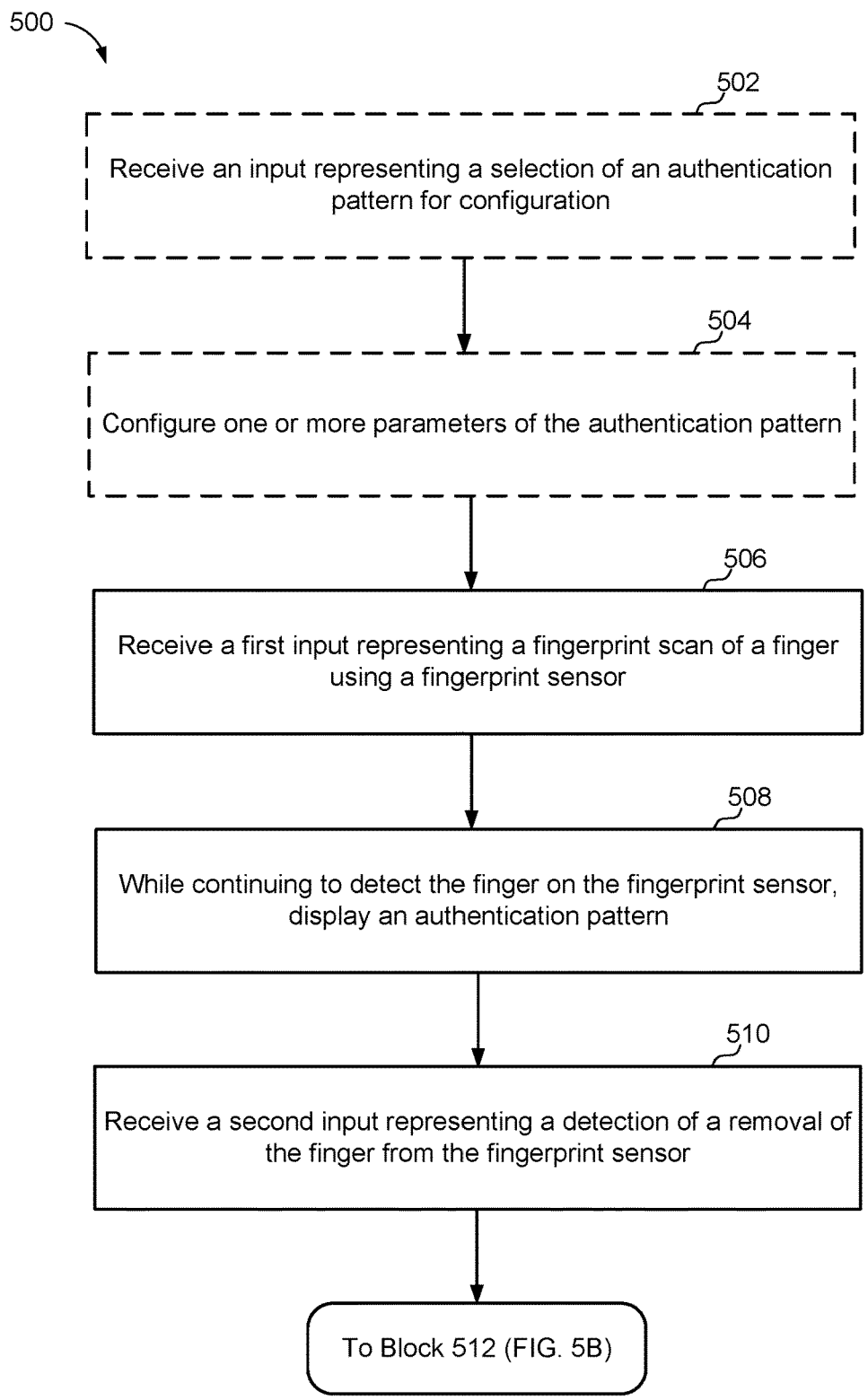
FIGS. 5A and 5B are flow diagrams illustrating an example method of user authentication in accordance with various aspects of the present disclosure.
Figure 5B:
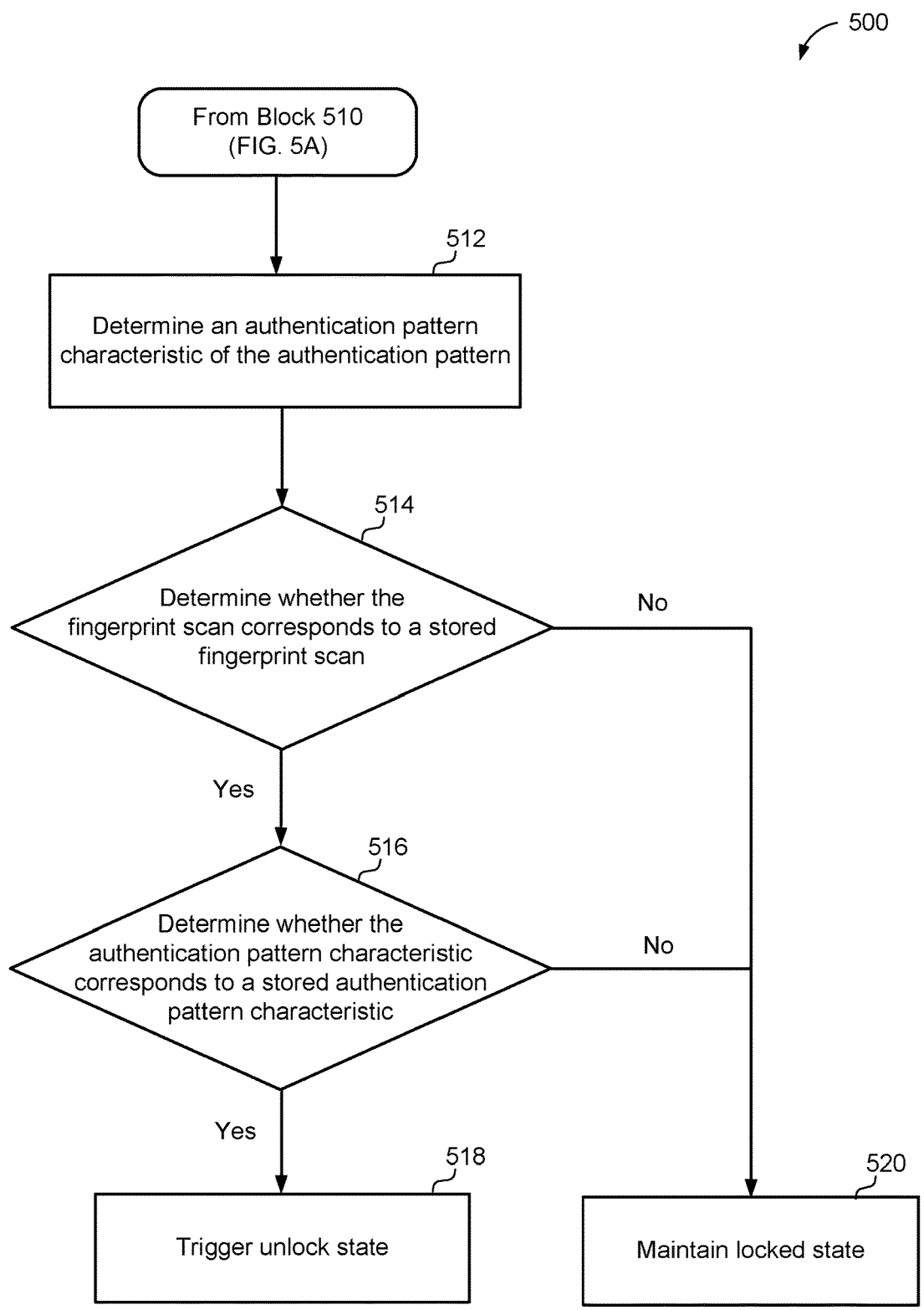

Referring to FIGS. 5A and 5B, an example of one or more operations of an aspect of the authenticator 120 (FIG. 1) according to the present apparatuses and methods are described with reference to one or more methods and one or more components that manage activation and deactivation of one or more sensors and/or data capture components. Although the operations described below are presented in a particular order and/or as being performed by an example component, the ordering of the actions and the components performing the actions may be varied, depending on the implementation. Also, although the authenticator 120 (FIG. 1) is illustrated as having a number of subcomponents, it should be understood that one or more of the illustrated subcomponents may be separate from, but in communication with, the authenticator 120 (FIG. 1) and/or each other. Moreover, it should be understood that the following actions or components described with respect to the authenticator 120 (FIG. 1) and/or the authenticator's 120 subcomponents may be performed by a specially-programmed processor, a processor executing specially-programmed software or computer-readable media, or by any other combination of a hardware component and/or a software component specially configured for performing the described actions or components.

The method 500 may, at block 502, optionally receive an input representing a selection of an authentication pattern for configuration. For example, in some aspects, UE 100 (FIG. 1) may execute one or more of buttons/keys 134 (FIG. 1) and/or display 136 (FIG. 1), which may take the form of a touch-sensitive display to receive an input representing a selection of an authentication pattern 124 (e.g., visual timer, visual color pattern, and/or visual shape pattern) for configuration.

At block 504, method 500 may optionally configure one or more parameters of the authentication pattern. For instance, in some aspects, UE 100 may execute authenticator 120 (FIG. 1) to configure one or more parameters of the authentication pattern 124 (e.g., visual timer, visual color pattern, and/or visual shape pattern), the one or more parameters corresponding to the stored authentication pattern characteristic 156. In some aspects, as part of configuring the one or more parameters, method 500 may store, as secure user data (e.g., in a user profile), a fingerprint of the user, the selected authentication pattern(s), and the selected authentication pattern characteristic(s), each of which may be associated with each other.

Further, at block 506, method 500 may receive a first input representing a fingerprint scan of a finger using a fingerprint sensor. For example, in some aspects, UE 100 may execute biometric sensor 138 (FIG. 1) to receive a first input representing a fingerprint scan 122 using the biometric sensor 138. In some aspects, the first input may be received during or while the UE 100 is in a locked state.

At block 508, method 500 may, while continuing to detect the finger on the fingerprint sensor, display an authentication pattern. For instance, in some aspects, UE 100 may execute the display 136 (FIG. 1) to display an authentication pattern 124 while continuing to detect the scan of the fingerprint (e.g., detect user's finger on the biometric sensor 138) and in response to receiving the first input (e.g., initial fingerprint scan 122).

In some aspects, displaying the authentication pattern 124 may include displaying a visual timer having a visual indicator advance from a start time to an end time. In some aspects, the start time and the end time may form a total duration of time in seconds. Further, in some aspects, the start time may be less than or greater than the end time.

In some aspects, displaying the authentication pattern 124 may include displaying a visual color sequence having at least a first color associated with a first portion of the display 136 and a second color associated with a second portion of the display 136. Additionally, in some aspects, displaying the visual color sequence may include advancing a visual indicator from the first portion of the display 136 to the second portion of the display 136 to reveal an associated color within at least one of the first portion or the second portion.

Further, in some aspects, the first portion may border or be adjacent to the second portion and the first color may be different from the second color. In some aspects, the first portion may not border or be adjacent to the second portion and the first color may be different from the second color. In addition, in some aspects, displaying the visual color sequence may include sequentially displaying the first color for a first period of time and the second color for a second period of time equal to the first period of time. In some aspects, displaying the visual color sequence may include displaying the first color for a first period of time and the second color for a second period of time different from the first period of time.

Further, in some aspects, displaying the visual color sequence may include randomly displaying the first color for a first period of time and the second color for a second period of time. That is, the first color and the second color may be displayed in a randomized manner (e.g., no particular order) for a corresponding period of time. In some aspects, the first period of time may be equal to or distinct from the second period of time.

In some aspects, displaying the authentication pattern may include displaying a number of shapes within one or more portions of the display. Further, in some aspects, displaying the number of shapes may include displaying each of the number of shapes for a duration of time within the one or more portions of the display. Additionally, in some aspects, displaying the number of shapes includes randomly displaying the number of shapes at the one or more portions of the display. In some aspects, displaying the number of shapes may include sequentially displaying the number of shapes at the one or more portions of the display. In some aspects, the one or more portions of the display may include two or more portions of the display. Further, in some aspects, the two or more portions may share a border or are separated by a distance. Moreover, in some aspects, the one or more portions may correspond to one or more distinct portions of the display.

Additionally, at block 510, method 500 may receive a second input representing a detection of a removal of the finger from the fingerprint sensor. For instance, in some aspects, UE 100 may read/execute biometric sensor 138 to receive a second input representing a detection of a removal or liftoff of the finger from the biometric sensor 138. In some aspects, the second input may be associated with or otherwise include the authentication pattern characteristic 126.

Method 500 may proceed to block 512 at FIG. 5B.

At block 512, method 500 may determine an authentication pattern characteristic of the authentication pattern. For example, in some aspects, UE 100 may execute authenticator 120 (FIG. 1) to determine an authentication pattern characteristic 126 (FIG. 1) of the authentication pattern 124 in response to the detection of the removal of the finger from the biometric sensor 138. In some aspects, the authentication pattern characteristic 126 may be a displayed attribute of the authentication pattern 124 at a particular moment in time.

In some aspects, the authentication pattern characteristic 126 may correspond to a timer value corresponding to a location of the visual indicator between the start time and the end time representing the detection of the removal of the finger from the biometric sensor 138. Further, in some aspects, the authentication pattern characteristic 126 may correspond to a color displayed during the removal of the finger from the biometric sensor 138. Additionally, in some aspects, the authentication pattern characteristic 126 may correspond to at least one shape of the number of shapes displayed within a portion from the one or more portions of the display 136.

At block 514, method 500 may determine whether the fingerprint scan corresponds to a stored fingerprint scan. For example, in some aspects, UE 100 and/or authenticator 120 may execute two factor determiner 128 (FIG. 1) to determine whether the fingerprint scan 122 corresponds to or otherwise matches a stored fingerprint scan 152.

Method 500 may proceed to block 520 upon a determination at block 514 that the fingerprint scan 122 does not correspond to the stored fingerprint scan 152. Specifically, at block 512, method 500 may maintain a locked state. For instance, in some aspects, UE 100 may be configured to maintain a locked state based on a determination that the fingerprint scan 122 does not correspond to the stored fingerprint scan 152.

Otherwise, method 500 may proceed to block 516 upon a determination that the fingerprint scan corresponds to the stored fingerprint scan. In particular, at block 514, method 500 may determine whether the authentication pattern characteristic corresponds to a stored authentication pattern characteristic. For example, in some aspects, UE 100 and/or authenticator 120 may execute two factor determiner 128 to determine whether the authentication pattern characteristic 126 corresponds to a stored authentication pattern characteristic 156 (FIG. 1), which may be associated with the (matched) stored fingerprint scan. That is, in some aspects, the stored fingerprint scan may be associated with the stored authentication pattern characteristic of the authentication pattern.

In some aspects, determining whether the authentication pattern characteristic 126 corresponds to the stored authentication pattern characteristic 156 may include determining whether the timer value falls within a first selected time value and a second selected time value. For example, in some aspects, the first selected time value may be greater than or equal to the start time and the second selected time value may be greater than the first selected time value and less than or equal to the end time.

Additionally, in some aspects, determining whether the authentication pattern characteristic 126 corresponds to the stored authentication pattern characteristic 156 may include determining whether the color corresponds to a pre-selected color. Further, in some aspects, determining whether the authentication pattern characteristic 126 corresponds to the stored authentication pattern characteristic 156 may include determining whether the at least one shape positioned at the portion of the display corresponds to a pre-selected shape positioned at a pre-selected portion.

Method 500 may proceed to block 520 upon a determination that the authentication pattern characteristic does not correspond to the stored authentication pattern characteristic. Specifically, method 500 may maintain the locked state based on a determination that the authentication pattern characteristic does not correspond to the stored authentication pattern characteristic.

Otherwise, method 500 may proceed to block 518 upon a determination that the authentication pattern characteristic corresponds to the stored authentication pattern characteristic. Specifically, at block 518, method 500 may trigger an unlock state. For example, in some aspects, UE 100 may be configured to trigger an unlock state in accordance with a determination that fingerprint scan 122 corresponds to the stored fingerprint scan 152 and the authentication pattern characteristic 126 corresponds to the stored authentication pattern characteristic 156 (e.g., for the stored fingerprint scan that matches).

In some aspects, the determination at block 516 may precede the determination at block 514. In some aspects, the determinations at both blocks 514 and 516 may be made in tandem or concurrently.

Further, in some aspects, method 500 may not be limited to authenticating a user based at least in part on a fingerprint scan and/or data as part of a two factor determination. That is, method 500 may authenticate a user based on, for example, iris data, retina data, facial data, and/or speech/voice data. In such aspect, method 500 may receive the first input representing a biometric scan corresponding to at least one of an iris scan of at least one of a user's iris using an iris scanner, a retina scan of at least one of a user's retina using a retina scanner, a facial scan of a user using an image capturing device (e.g., camera 144, FIG. 1), and/or a voice recording of one or more words/phrase spoken by a user using a microphone 132 (FIG. 1).

Additionally, while continuing to detect or otherwise receive the biometric scan/data (e.g., iris scan, retina scan, facial scan, and/or voice recording), method 500 may display on the display 136 (FIG. 1), at least one of the authentication patterns disclosed herein in response to receiving the first input. Further, method 500 may receive a second input representing a detection of a termination of the biometric scan or termination of a reception of the biometric data from the biometric sensor 138, which may correspond to an identification by the user of a selected authentication pattern characteristic. Method 500 may continue as described herein from block 512 to block 520.

Figure 6:
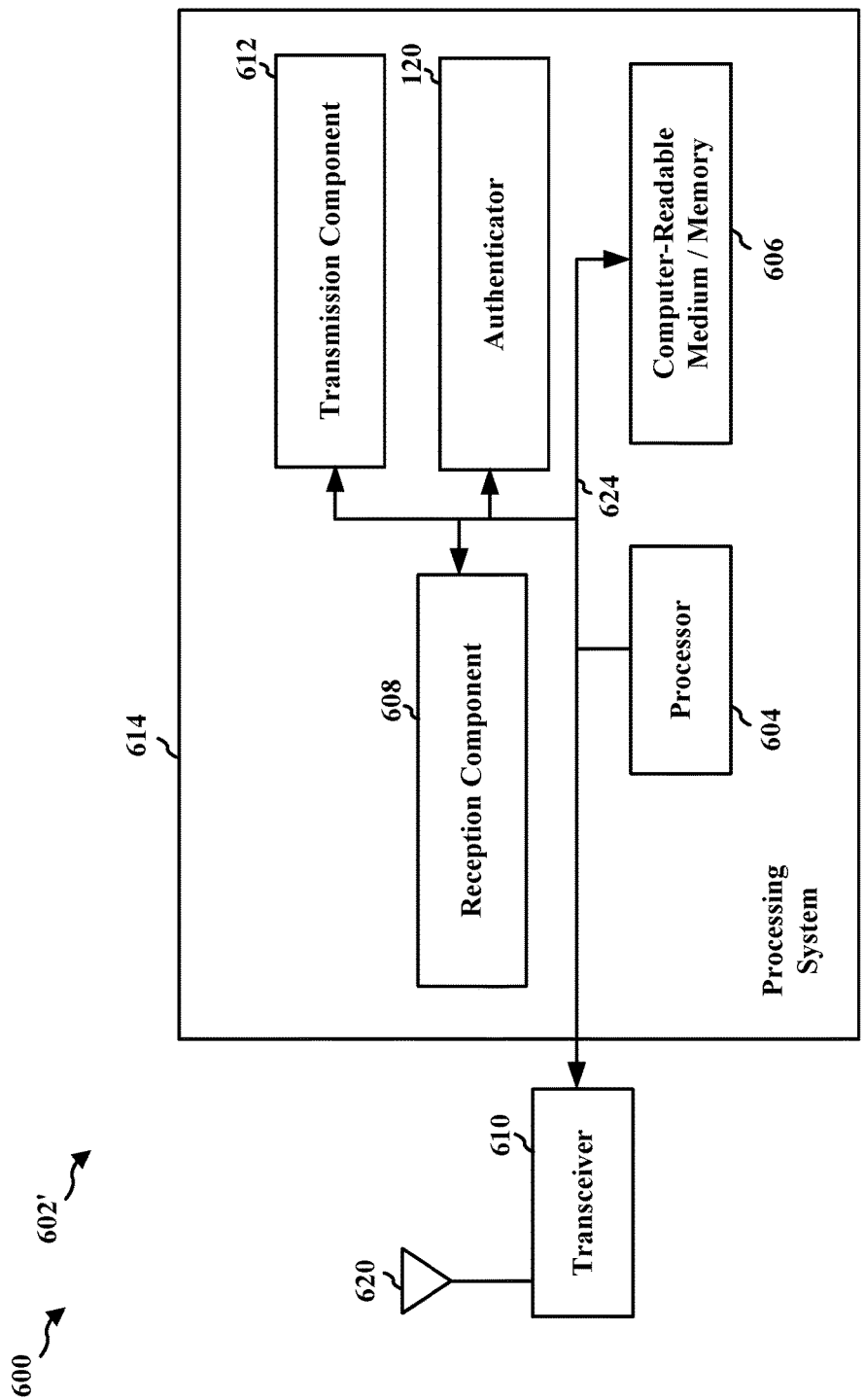
FIG. 6 is a diagram illustrating an example of a hardware implementation for an apparatus employing a processing system including an authenticator in accordance with various aspects of the present disclosure.

FIG. 6 is a diagram 600 illustrating an example of a hardware implementation for an apparatus 602' employing a processing system 614 that includes the authenticator 120 (FIG. 1). The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, represented by the processor 604, the components 604, 608, 612, and the authenticator 120, and the computer-readable medium/memory 606. The bus 624 may also link various other circuits such as timing sources, peripherals, voltage regulators, and power management circuits, which are well known in the art, and therefore, will not be described any further.

The processing system 614 may be coupled to a transceiver 610. The transceiver 610 is coupled to one or more antennas 620. The transceiver 610 provides a means for communicating with various other apparatus over a transmission medium. The transceiver 610 receives a signal from the one or more antennas 620, extracts information from the received signal, and provides the extracted information to the processing system 614, specifically the reception component 608. In addition, the transceiver 610 receives information from the processing system 614, specifically the transmission component 612, and based on the received information, generates a signal to be applied to the one or more antennas 620. The processing system 614 includes a processor 604 coupled to a computer-readable medium/memory 606. The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The components may be software components running in the processor 604, resident/stored in the computer readable medium/memory 606, one or more hardware components coupled to the processor 604, or some combination thereof.

In one configuration, the apparatus 602/602' includes means for receiving a first input representing a scan of a fingerprint using a fingerprint sensor. The apparatus 602/602' further includes, while continuing to detect the scan of the fingerprint, means for displaying, on a display, an authentication pattern in response to receiving the first input. The apparatus 602/602' further includes means for receiving a second input representing a detection of a removal of a finger from the fingerprint sensor. The apparatus 602/602' further includes means for determining an authentication pattern characteristic of the authentication pattern in response to the detection of the removal of the finger from the fingerprint sensor. The apparatus 602/602' further includes means for determining whether the fingerprint scan corresponds to a stored fingerprint scan and whether the authentication pattern characteristic of the authentication pattern corresponds to a stored authentication pattern characteristic. The apparatus 600/602' further includes means for triggering an unlock state in accordance with a determination that fingerprint scan corresponds to the stored fingerprint scan and the authentication pattern characteristic corresponds to the stored authentication pattern characteristic. The apparatus 600/602' further includes means for maintaining a locked state in accordance with a determination that fingerprint scan does not correspond to the stored fingerprint scan or the authentication pattern characteristic does not correspond to the stored authentication pattern characteristic. The aforementioned means may be one or more of the aforementioned components of the apparatus 602 and/or the processing system 614 of the apparatus 602' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the foregoing disclosure shows illustrative aspects, it should be noted that various changes and modifications could be made herein without departing from the scope of the disclosure as defined by the appended claims. The functions, steps blocks and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of user authentication at a user equipment (UE), comprising:
   receiving a first input representing a fingerprint scan of a finger using a fingerprint sensor;
   while continuing to detect the finger on the fingerprint sensor, displaying, on a display, an authentication pattern in response to receiving the first input, wherein displaying the authentication pattern includes displaying sequentially or randomly each of a number of shapes for a duration of time within one or more portions of the display, wherein each of the number of shapes is displayed for a different duration of time on the display;
   receiving a second input representing a detection of a removal of the finger from the fingerprint sensor;
   determining an authentication pattern characteristic of the authentication pattern in response to the detection of the removal of the finger from the fingerprint sensor;
   determining whether the fingerprint scan corresponds to a stored fingerprint scan and whether the authentication pattern characteristic of the authentication pattern corresponds to a stored authentication pattern characteristic;
   triggering an unlock state in accordance with a determination that the fingerprint scan corresponds to the stored fingerprint scan and the authentication pattern characteristic corresponds to the stored authentication pattern characteristic; and
   maintaining a locked state in accordance with a determination that the fingerprint scan does not correspond to the stored fingerprint scan or that the authentication pattern characteristic does not correspond to the stored authentication pattern characteristic.

2. The method of claim 1, wherein displaying the authentication pattern includes displaying a visual timer having a visual indicator advance from a start time to an end time.

3. The method of claim 2, wherein the authentication pattern characteristic corresponds to a timer value corresponding to a location of the visual indicator between the start time and the end time representing the detection of the removal of the finger from the fingerprint sensor.

4. The method of claim 3, wherein determining whether the authentication pattern characteristic corresponds to the stored authentication pattern characteristic includes determining whether the timer value falls within a first selected time value and a second selected time value.

5. The method of claim 4, wherein the first selected time value is greater than or equal to the start time and the second selected time value is greater than the first selected time value and less than or equal to the end time.

6. The method of claim 2, wherein the start time and the end time form a total duration of time in seconds.

7. The method of claim 2, wherein the start time is less than the end time.

8. The method of claim 2, wherein the start time is greater than the end time.

9. The method of claim 1, wherein displaying the authentication pattern includes displaying a visual color sequence having at least a first color associated with a first portion and a second color associated with a second portion.

10. The method of claim 9, wherein displaying the visual color sequence includes advancing a visual indicator from the first portion to the second portion to reveal an associated color within at least one of the first portion or the second portion.

11. The method of claim 9, wherein the authentication pattern characteristic corresponds to a color displayed during the removal of the finger from the fingerprint sensor.

12. The method of claim 11, wherein determining whether the authentication pattern characteristic corresponds to the stored authentication pattern characteristic includes determining whether the color corresponds to a pre-selected color.

13. The method of claim 9, wherein the first portion is adjacent to the second portion and the first color is different from the second color.

14. The method of claim 9, wherein the first portion does not border the second portion and the first color is different from the second color.

15. The method of claim 9, wherein displaying the visual color sequence includes sequentially displaying the first color for a first period of time and the second color for a second period of time equal to the first period of time.

16. The method of claim 9, wherein displaying the visual color sequence includes sequentially displaying the first color for a first period of time and the second color for a second period of time different from the first period of time.

17. The method of claim 9, wherein displaying the visual color sequence includes randomly displaying the first color for a first period of time and the second color for a second period of time.

18. The method of claim 17, wherein the first period of time is equal to or distinct from the second period of time.

19. The method of claim 1, wherein the authentication pattern characteristic corresponds to at least one shape of the number of shapes displayed within a portion from the one or more portions of the display.

20. The method of claim 19, wherein determining whether the authentication pattern characteristic corresponds to the stored authentication pattern characteristic includes determining whether the at least one shape positioned at the portion of the display corresponds to a pre-selected shape positioned at a pre-selected portion.

21. The method of claim 1, wherein the one or more portions of the display include two or more portions of the display.

22. The method of claim 21, wherein the two or more portions share a border or are separated by a distance.

23. The method of claim 1, wherein the one or more portions correspond to one or more distinct portions of the display.

24. The method of claim 1, further comprising:
receiving a third input representing a selection of the authentication pattern for configuration; and
configuring one or more parameters of the authentication pattern in response to receiving the third input.

25. The method of claim 24, wherein the stored fingerprint scan is associated with the stored authentication pattern characteristic of the authentication pattern.

26. The method of claim 1, wherein the second input is associated with the authentication pattern characteristic.

27. An apparatus for user authentication, comprising:
means for receiving a first input representing a fingerprint scan of a finger using a fingerprint sensor;
while continuing to detect the finger on the fingerprint sensor, means for displaying, on a display, an authentication pattern in response to receiving the first input, wherein to display the authentication pattern, the means for displaying further configured to display sequentially or randomly each of a number of shapes for a duration of time within one or more portions of the display, wherein the means for displaying further configured to display each of the number of shapes for a different duration of time on the display;
means for receiving a second input representing a detection of a removal of the finger from the fingerprint sensor;
means for determining an authentication pattern characteristic of the authentication pattern in response to the detection of the removal of the finger from the fingerprint sensor;
means for determining whether the fingerprint scan corresponds to a stored fingerprint scan and whether the authentication pattern characteristic of the authentication pattern corresponds to a stored authentication pattern characteristic;
means for triggering an unlock state in accordance with a determination that the fingerprint scan corresponds to the stored fingerprint scan and the authentication pattern characteristic corresponds to the stored authentication pattern characteristic; and
means for maintaining a locked state in accordance with a determination that the fingerprint scan does not correspond to the stored fingerprint scan or that the authentication pattern characteristic does not correspond to the stored authentication pattern characteristic.

28. A computer-readable storage device storing computer executable code for user authentication, comprising code for:
receiving a first input representing a fingerprint scan of a finger using a fingerprint sensor;
while continuing to detect the finger on the fingerprint sensor, displaying, on a display, an authentication pattern in response to receiving the first input, wherein displaying the authentication pattern includes displaying sequentially or randomly each of a number of shapes for a duration of time within one or more portions of the display, wherein each of the number of shapes is displayed for a different duration of time on the display;
receiving a second input representing a detection of a removal of the finger from the fingerprint sensor;
determining an authentication pattern characteristic of the authentication pattern in response to the detection of the removal of the finger from the fingerprint sensor;
determining whether the fingerprint scan corresponds to a stored fingerprint scan and whether the authentication pattern characteristic of the authentication pattern corresponds to a stored authentication pattern characteristic;

triggering an unlock state in accordance with a determination that the fingerprint scan corresponds to the stored fingerprint scan and the authentication pattern characteristic corresponds to the stored authentication pattern characteristic; and maintaining a locked state in accordance with a determination that the fingerprint scan does not correspond to the stored fingerprint scan or that the authentication pattern characteristic does not correspond to the stored authentication pattern characteristic.

29. An apparatus for user authentication, comprising:
a display;
a memory;
a fingerprint sensor; and
at least one processor coupled to the display, the memory, and the fingerprint sensor, wherein the at least one processor is configured to:
receive a first input representing a fingerprint scan of a finger using the fingerprint sensor;
while continuing to detect the finger on the fingerprint sensor, display, on the display, an authentication pattern in response to receiving the first input, wherein displaying the authentication pattern includes displaying sequentially or randomly each of a number of shapes for a duration of time within one or more portions of the display, wherein the at least one processor is further configured to display each of the number of shapes for a different duration of time on the display;
receive a second input representing a detection of a removal of the finger from the fingerprint sensor;
determine an authentication pattern characteristic of the authentication pattern in response to the detection of the removal of the finger from the fingerprint sensor;
determine whether the fingerprint scan corresponds to a stored fingerprint scan and whether the authentication pattern characteristic of the authentication pattern corresponds to a stored authentication pattern characteristic;
trigger an unlock state in accordance with a determination that the fingerprint scan corresponds to the stored fingerprint scan and the authentication pattern characteristic corresponds to the stored authentication pattern characteristic; and
maintain a locked state in accordance with a determination that the fingerprint scan does not correspond to the stored fingerprint scan or that the authentication pattern characteristic does not correspond to the stored authentication pattern characteristic.

30. The apparatus of claim 29, wherein to display the authentication pattern, the at least one processor is further configured to display a visual timer having a visual indicator advance from a start time to an end time.

31. The apparatus of claim 30, wherein the authentication pattern characteristic corresponds to a timer value corresponding to a location of the visual indicator between the start time and the end time representing the detection of the removal of the finger from the fingerprint sensor.

32. The apparatus of claim 31, wherein to determine whether the authentication pattern characteristic corresponds to the stored authentication pattern characteristic, the at least one processor is further configured to determine whether the timer value falls within a first selected time value and a second selected time value.

33. The apparatus of claim 32, wherein the first selected time value is greater than or equal to the start time and the second selected time value is greater than the first selected time value and less than or equal to the end time.

34. The apparatus of claim 30, wherein the start time and the end time form a total duration of time in seconds.

35. The apparatus of claim 30, wherein the start time is less than the end time.

36. The apparatus of claim 30, wherein the start time is greater than the end time.

37. The apparatus of claim 29, wherein to display the authentication pattern, the at least one processor is further configured to display a visual color sequence having at least a first color associated with a first portion and a second color associated with a second portion.

38. The apparatus of claim 37, wherein to display the visual color sequence, the at least one processor is further configured to advance a visual indicator from the first portion to the second portion to reveal an associated color within at least one of the first portion or the second portion.

39. The apparatus of claim 37, wherein the authentication pattern characteristic corresponds to a color displayed during the removal of the finger from the fingerprint sensor.

40. The apparatus of claim 39, wherein to determine whether the authentication pattern characteristic corresponds to the stored authentication pattern characteristic, the at least one processor is further configured to determine whether the color corresponds to a pre-selected color.

41. The apparatus of claim 37, wherein the first portion is adjacent to the second portion and the first color is different from the second color.

42. The apparatus of claim 37, wherein the first portion is does not border the second portion and the first color is different from the second color.

43. The apparatus of claim 37, wherein to display the visual color sequence, the at least one processor is further configured to sequentially display the first color for a first period of time and the second color for a second period of time equal to the first period of time.

44. The apparatus of claim 37, wherein to display the visual color sequence, the at least one processor is further configured to sequentially display the first color for a first period of time and the second color for a second period of time different from the first period of time.

45. The apparatus of claim 37, wherein to display the visual color sequence, the at least one processor is further configured to randomly display the first color for a first period of time and the second color for a second period of time.

46. The apparatus of claim 45, wherein the first period of time is equal to or distinct from the second period of time.

47. The apparatus of claim 29, wherein the authentication pattern characteristic corresponds to at least one shape of the number of shapes displayed within a portion from the one or more portions of the display.

48. The apparatus of claim 47, wherein to determine whether the authentication pattern characteristic corresponds to the stored authentication pattern characteristic, the at least one processor is further configured to determine whether the at least one shape positioned at the portion of the display corresponds to a pre-selected shape positioned at a pre-selected portion.

49. The apparatus of claim 29, wherein the one or more portions of the display include two or more portions of the display.

50. The apparatus of claim 49, wherein the two or more portions share a border or are separated by a distance.

51. The apparatus of claim 29, wherein the one or more portions correspond to one or more distinct portions of the display.

52. The apparatus of claim 29, wherein the at least one processor is further configured to:
- receive a third input representing a selection of the authentication pattern for configuration; and
- configure one or more parameters of the authentication pattern in response to receiving the third input.

53. The apparatus of claim 52, wherein the stored fingerprint scan is associated with the stored authentication pattern characteristic of the authentication pattern.

54. The apparatus of claim 29, wherein the second input is associated with the authentication pattern characteristic.

* * * * *